United States Patent
Taira et al.

(10) Patent No.: US 8,285,237 B2
(45) Date of Patent: Oct. 9, 2012

(54) RECEIVING APPARATUS

(75) Inventors: Masaaki Taira, Akashi (JP); Masaya Suto, Maebashi (JP)

(73) Assignees: Sanyo Electric Co., Ltd., Osaka (JP); Sanyo Semiconductor Co., Ltd., Gunma (JP)

( * ) Notice: Subject to any disclaimer, the term of this patent is extended or adjusted under 35 U.S.C. 154(b) by 389 days.

(21) Appl. No.: 12/772,674

(22) Filed: May 3, 2010

(65) Prior Publication Data

US 2010/0285768 A1 Nov. 11, 2010

(30) Foreign Application Priority Data

May 7, 2009 (JP) ................................ 2009-112926

(51) Int. Cl.
*H04B 17/00* (2006.01)
(52) U.S. Cl. ..................................... 455/226.1; 455/306
(58) Field of Classification Search .... 455/226.1–226.4, 455/296, 303, 306, 307
See application file for complete search history.

(56) References Cited

U.S. PATENT DOCUMENTS

| 7,327,813 B2 * | 2/2008 | Murakami et al. ............ 455/307 |
| 7,343,143 B2 * | 3/2008 | Gamou ........................ 455/226.1 |
| 2009/0233569 A1 * | 9/2009 | Wakutsu ........................ 455/296 |

FOREIGN PATENT DOCUMENTS

JP 2003-174373 A 6/2003

* cited by examiner

*Primary Examiner* — Lana N Le
(74) *Attorney, Agent, or Firm* — Osha Liang LLP

(57) ABSTRACT

A receiving apparatus comprising: a frequency-fluctuation-detection unit to detect a frequency difference between a received and desired signals; a first-undesired-level-detection unit to output as a first-undesired level an amplitude-level-difference between the signals having passed through first-and-second-band-pass filters in the received signals; one or a plurality of second-undesired-level-detection units to output amplitude levels of signals having passed through third-and-fourth-band-pass filters in the received signals as second-and-third-undesired levels, respectively, and output a sum of the second-and-third-undesired levels as a fourth-undesired level; and a determination unit to determine whether an undesired state, where an adjacent-undesired signal is present, occurs according to the fourth-undesired level if an absolute value of the frequency difference is equal to or greater than a predetermined-reference value, and select any one of the first-to-third-undesired levels to be outputted according to at least one of the frequency difference and the fourth-undesired level if determining that the undesired state occurs.

7 Claims, 5 Drawing Sheets

RECEIVING APPARATUS

CROSS-REFERENCE TO RELATED APPLICATION

This application claims the benefit of priority to Japanese Patent Application No. 2009-112926, filed May 7, 2009, of which full contents are incorporated herein by reference.

BACKGROUND OF THE INVENTION

1. Field of the Invention

The present invention relates to a receiving apparatus.

2. Description of the Related Art

In radio communication, a received signal is subjected to filtering processing, frequency conversion processing, amplification processing and the like, to be demodulated to a baseband signal in general. Also, a receiving apparatus is generally known, which detects a reception status such as electric field intensity of the received signal or presence/absence of an undesired signal and which controls characteristics such as the filtering processing and the amplification processing according to the reception status, in order to improve communication quality in the radio communication.

For example, in FIG. 2 of Japanese Patent Laid-Open Publication No. 2003-174373, there is disclosed an adjacent interference detection unit for detecting an adjacent undesired signal using a first-method adjacent interference detection unit by a broad-narrow band difference method and a second-method adjacent interference detection unit by an adjacent band addition method. Also, in FIG. 14 of Japanese Patent Laid-Open Publication No. 2003-174373, there is disclosed an adjacent interference detection unit that can prevent wrong determination when a modulation degree of a desired signal is high by further using a third-method adjacent interference detection unit by an adjacent band difference method. Moreover, in Japanese Patent Laid-Open Publication No. 2003-174373, there is disclosed a broadcasting receiving apparatus for controlling the characteristics of the filtering processing and stereo separation (degree of separation) in a stereo demodulation unit according to a detection result in the adjacent interference detection unit.

As such, by using BPFs (Band-Pass Filter) having different passbands in combination, an adjacent undesired signal can be detected and communication quality of the receiving apparatus and sound quality of the broadcasting receiving apparatus can be improved.

However, since the third-method adjacent interference detection unit employed in the adjacent interference detection unit in FIG. 14 of Japanese Patent Laid-Open Publication No. 2003-174373 calculates a difference in amplitude level between an adjacent band higher than a frequency of the desired signal and an adjacent band lower than that, a smoothing processing unit having a sufficiently large time constant with respect to a frequency of the baseband signal is required. Thus, a response speed of the entire adjacent interference detection unit is limited by the time constant, and longer time is required for determining presence or absence of the adjacent undesired signal.

SUMMARY OF THE INVENTION

A receiving apparatus according to an aspect of the present invention, comprises: a frequency fluctuation detection unit configured to detect a frequency difference between a frequency of a received signal and a frequency of a desired signal to be received; a first undesired level detection unit including first and second band-pass filters having passbands whose band widths are different from each other and whose centers are the frequency of the desired signal, the first undesired level detection unit configured to output as a first undesired level a difference in amplitude level between the signals having passed through the first and second band-pass filters in the received signals; one or a plurality of second undesired level detection units including third and fourth band-pass filters having passbands whose centers are the frequencies lower and higher by a predetermined frequency than the frequency of the desired signal, respectively, the one or the plurality of second undesired level detection units configured to output amplitude levels of signals having passed through the third and fourth band-pass filters in the received signals as second and third undesired levels, respectively, and output a sum of the second and third undesired levels as a fourth undesired level; and a determination unit configured to determine whether or not a state is an undesired state where an adjacent undesired signal is present according to the fourth undesired level if an absolute value of the frequency difference is equal to or greater than a predetermined reference value, the determination unit further configured to select any one of the first to third undesired levels to be outputted according to at least one of the frequency difference and the fourth undesired level if determining that the state is the undesired state.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

FIRST EMBODIMENT

Configuration and Operation of Entire Receiving Apparatus

A configuration of an entire receiving apparatus according to a first embodiment of the present invention will, hereinafter, be described referring to FIG. 2.

Figure 2:
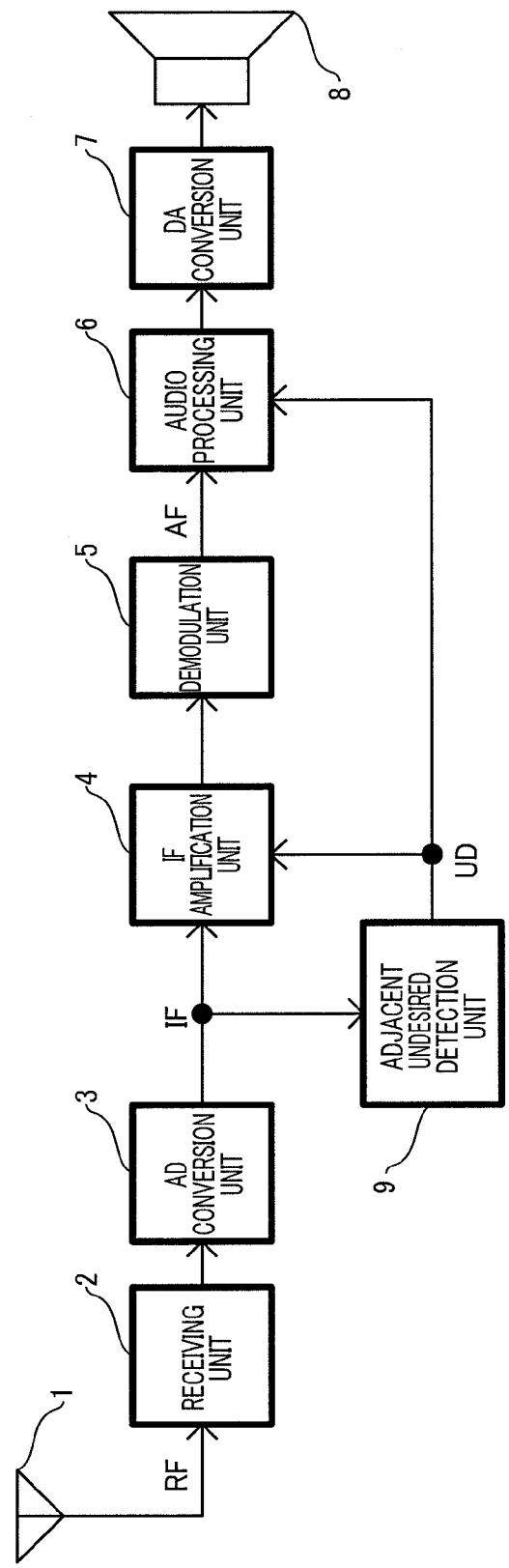
FIG. 2 is a block diagram illustrating a configuration of an entire receiving apparatus according to first and second embodiments of the present invention.

The receiving apparatus shown in FIG. 2 includes an antenna 1, a receiving unit 2, an AD (analog-digital) conversion unit 3, an IF (Intermediate Frequency) amplification unit 4, a demodulation unit 5, an audio processing unit 6, a DA (digital-analog) conversion unit 7, a speaker 8, and an adjacent interference detection unit 9, and is used for receiving FM radio broadcasting, for example.

An RF (Radio Frequency) signal outputted from the antenna 1 is inputted to the receiving unit 2, and an output signal of the receiving unit 2 is inputted to the AD conversion unit 3. An IF signal outputted from the AD conversion unit 3 is inputted to the IF amplification unit 4 as well as the adjacent interference detection unit 9.

An output signal of the IF amplification unit 4 is inputted to the demodulation unit 5 and an AF (Audio Frequency) signal outputted from the demodulation unit 5 is inputted to the audio processing unit 6. An output signal of the audio processing unit 6 is inputted to the DA conversion unit 7, and an output signal of the DA conversion unit 7 is inputted to the speaker 8.

On the other hand, an undesired level determination value UD outputted from the adjacent interference detection unit 9 is inputted to the IF amplification unit 4 and the audio processing unit 6.

Subsequently, an operation of the entire receiving apparatus according to an embodiment of the present invention will be described.

The antenna 1 receives a broadcast wave of the FM radio broadcasting, for example, and outputs an RF signal. The receiving unit 2 selectively amplifies a frequency band including a desired signal to be received in the RF signal, converts its frequency, and eliminates an image signal or the like as appropriate using a BPF or the like. Moreover, the AD conversion unit 3 converts an output signal of the receiving unit 2 to an IF signal, which is a digital signal, to be outputted. Then, processing at the IF amplification unit 4 and the adjacent interference detection unit 9 and subsequent processing are digital signal processing using a digital circuit, a digital signal processor and the like.

The IF amplification unit 4 amplifies the IF signal as appropriate according to the undesired level determination value UD. The IF amplification unit 4 includes an IF filter, which is a BPF that changes a band width of a passband according to the undesired level determination value UD. Also, the demodulation unit 5 demodulates the IF signal amplified by the IF amplification unit 4 and outputs an AF signal.

The audio processing unit 6 controls volume and sound quality of the AF signal according to the undesired level determination value UD. For example, the audio processing unit 6 includes a stereo demodulation unit for demodulating the AF signal to a stereo signal with stereo separation (degree in separation) according to the undesired level determination value UD and an LPF (Low-Pass Filter) for eliminating from the AF signal a component of a cutoff frequency according to the undesired level determination value UD or more. Also, the DA conversion unit 7 converts the output signal of the audio processing unit 6 to an analog signal, to be outputted, and the speaker 8 converts the output signal of the DA conversion unit 7 to sound, to be outputted.

The adjacent interference detection unit 9 detects an adjacent undesired signal (adjacent interference signal) on the basis of the IF signal and outputs the undesired level determination value UD. The operation of the adjacent interference detection unit 9 will be described in detail later.

Configuration of Adjacent Interference Detection Unit

A configuration of the adjacent interference detection unit according to an embodiment of the present invention will hereinafter be described referring to FIG. 1.

Figure 1:
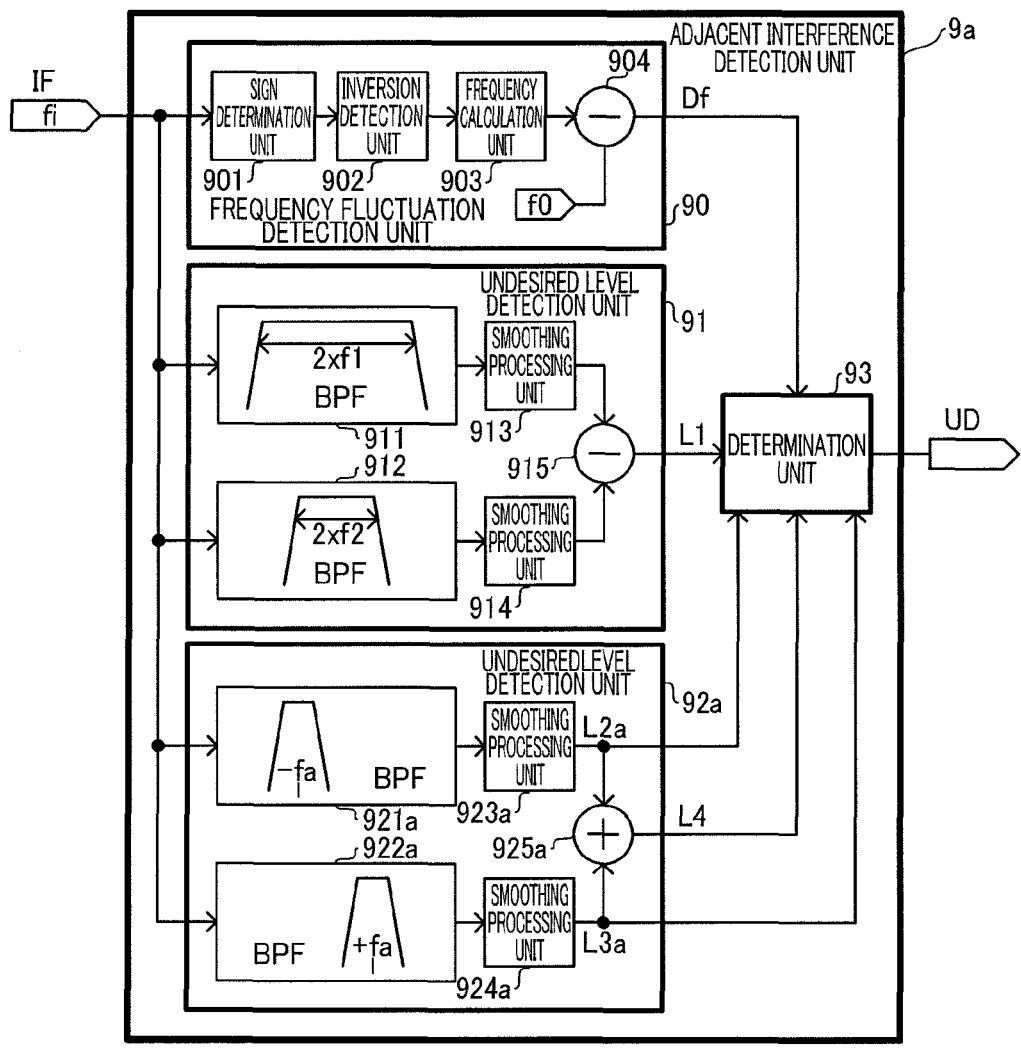
FIG. 1 is a block diagram illustrating a configuration of an adjacent interference detection unit according to a first embodiment of the present invention.

An adjacent interference detection unit 9a shown in FIG. 1 includes a frequency fluctuation detection unit 90, undesired level detection units 91, 92a, and a determination unit 93, and the IF signal outputted from the AD conversion unit 3 is inputted in parallel to the frequency fluctuation detection unit 90 and the undesired level detection units 91, 92a.

The frequency fluctuation detection unit 90 includes, in an embodiment of the present invention, a sign determination unit 901, an inversion detection unit 902, a frequency calculation unit 903, and a subtraction unit 904, for example. The IF signal is inputted to the sign determination unit 901, and the output signal of the sign determination unit 901 is inputted to the inversion detection unit 902. The output signal of the inversion detection unit 902 is inputted to the frequency calculation unit 903, and an output value of the frequency calculation unit 903 is inputted to the subtraction unit 904. Then, a frequency difference Df outputted from the subtraction unit 904 is inputted to the determination unit 93.

The (first) undesired level detection unit 91 includes BPFs 911, 912, smoothing processing units 913, 914, and a subtraction unit 915, for example, and corresponds to the first-method adjacent interference detection unit by the broad-narrow band difference method disclosed in Japanese Patent Laid-Open Publication No. 2003-174373. The IF signal is inputted in parallel to the (first) BPF 911 and the (second) BPF 912, and output signals of the BPFs 911 and 912 are inputted to the smoothing processing units 913 and 914, respectively. Output signals of the smoothing processing units 913 and 914 are both inputted to the subtraction unit 915. A (first) undesired level (interference level) L1 outputted from the subtraction unit 915 is inputted to the determination unit 93.

The (second) undesired level detection unit 92a includes BPFs 921a, 922a, smoothing processing units 923a, 924a, and an addition unit 925a, for example, and corresponds to the second-method adjacent interference detection unit by the adjacent band addition method disclosed in Japanese Patent Laid-Open Publication No. 2003-174373. The IF signal is inputted in parallel to the (third) BPF 921a and the (fourth) BPF 922a, and output signals of the BPFs 921a and 922a are inputted to the smoothing processing units 923a and 924a, respectively. A (second) undesired level L2a and a (third) undesired level L3a outputted from the smoothing processing units 923a and 924a, respectively, are both inputted to the determination unit 93. Moreover, the undesired levels L2a and L3a are both inputted to the addition unit 925a. Then, a (fourth) undesired level L4 outputted from the addition unit 925a is inputted to the determination unit 93.

The undesired level determination value UD outputted from the determination unit 93 is outputted from the adjacent interference detection unit 9a.

Operation of Adjacent Interference Detection Unit

Subsequently, an operation of the adjacent interference detection unit 9a according to an embodiment of the present invention will be described.

As mentioned above, in the receiving apparatus according to an embodiment of the present invention, frequency conversion from the RF band to the IF band is performed in the receiving unit 2, and a local oscillation frequency fL used in the frequency conversion is a frequency for converting a desired signal having a frequency fd in the RF band to a desired signal having a frequency $f0(=|fd-fL|)$ in the IF band. The frequency f0 of the desired signal in the IF band is a predetermined value, such as 10.7 MHz, in each receiving apparatus. Similarly, a received signal (RF signal) having a frequency fr in the RF band is converted to a received signal (IF signal) having a frequency fi(=|fr−fL|) in the IF band using the local oscillation frequency fL. In the receiving apparatus according to an embodiment of the present invention, it is assumed that automatic gain control is performed in the receiving unit 2, for example, and at least an amplitude level of the IF signal inputted to the adjacent interference detection unit 9a is controlled so as to become a substantially predetermined level.

The sign determination unit 901 of the frequency fluctuation detection unit 90 determines whether the IF signal is positive or negative, to output such a positive/negative determination result. As mentioned above, in an embodiment of the present invention, since the IF signal is a digital signal, the sign determination unit 901 outputs the positive/negative determination result as a binary signal by outputting a sign bit of the IF signal, for example.

The inversion detection unit 902 detects inversion of the positive/negative determination result of the sign determination unit 901, to output the inversion detection result. For example, the inversion detection unit 902 samples the positive/negative determination result, which is a binary signal, by a predetermined sampling clock, and outputs an exclusive OR of the continuous sampling results, to output the inversion detection result as a positive pulse.

Moreover, the frequency calculation unit 903 calculates a frequency fi of the IF signal from the inversion detection result of the inversion detection unit 902, to be outputted. The frequency calculation unit 903 counts the inversion detection result, which is a positive pulse, in every unit of time T, to calculate a frequency fi(=CN/T/2) on the basis of the count value CN, for example.

Then, the subtraction unit 904 subtracts the frequency f0 from the frequency fi, to output a frequency difference Df. As mentioned above, the frequencies fi and f0 are frequencies obtained by performing the frequency conversion from the RF band to the IF band for the received signal and the desired signal, respectively, using the same local oscillation frequency fL, and the frequency difference Df is a frequency difference (fi−f0) between the received signal and the desired signal in the IF band, as well as a frequency difference (fr−fd) between the received signal and the desired signal in the RF band.

If there is no adjacent undesired signal or the adjacent undesired signal is sufficiently small (amplitude level is low) with respect to the desired signal, the frequency of the received signal is substantially equal to the frequency of the desired signal, and the frequency difference Df is substantially 0. On the other hand, if there is a great (amplitude level is high) adjacent undesired signal, the frequency of the received signal is fluctuated according to the amplitude level or frequency of the adjacent undesired signal, and the frequency difference Df becomes a positive or negative value. Therefore, by the frequency difference Df, whether the adjacent undesired signal is present or absent and which is higher or lower in frequency between the adjacent undesired signal and the desired signal can be determined.

The BPFs 911 and 912 of the undesired level detection unit 91 have passbands with the band widths of 2×f1 and 2×f2, respectively, whose center is the frequency f0. Therefore, the BPF 911 passes the frequency component of f0−f1 to f0+f1 included in the IF signal, while the BPF 912 passes the frequency component of f0−f2 to f0+f2 included in the IF signal.

In an embodiment of the present invention, it is assumed that the frequencies f1 and f2 are in the relationship of f1>f2, and the BPF 911 has such a wide passband as to pass the adjacent undesired signals on the both sides of the desired signal, while the BPF 912 has such a narrow passband as to reject the adjacent undesired signals on the both sides of the desired signal.

The smoothing processing units 913 and 914 make the output signals of the BPFs 911 and 912 absolute values and then smooth them, respectively, so as to output the amplitude levels of the signals having passed through the BPFs 911 and 912, respectively, in the IF signals. Then, the subtraction unit 915 subtracts the output signal of the smoothing processing unit 914 from the output signal of the smoothing processing unit 913, to output as the undesired level L1 a difference in amplitude level between the signals having passed through the BPFs 911 and 912, respectively, in the IF signals.

As mentioned above, the BPF 911 passes the adjacent undesired signal while the BPF 912 rejects the adjacent undesired signal, and thus, the higher the amplitude level of the adjacent undesired signal is, the higher the undesired level L1 becomes. Also, as mentioned above, in an embodiment of the present invention, since the amplitude level of the IF signal is controlled so as to become the substantially predetermined level, the proportion of the adjacent undesired signal included in the received signal can be determined by the undesired level L1.

The BPFs 921a and 922a of the undesired level detection unit 92a have the passbands whose centers are the frequency (f0−fa) and the frequency (f0+fa), which are lower and higher than the frequency f0 only by a predetermined frequency fa, respectively. Therefore, the BPF 921a passes the frequency component in the vicinity of the f0−fa included in the IF signal, while the BPF 922a passes the frequency component in the vicinity of f0+fa included in the IF signal.

In an embodiment of the present invention, it is assumed that the BPFs 921a and 922a have the passbands to reject the desired signal and pass the adjacent undesired signals on the upper side and the lower side of the desired signal, respectively. As an example, if a broadcast frequency in the FM radio broadcasting is set at intervals of 100 kHzl, the frequency fa is set at 100 kHz, and the BPF 921a has a relatively narrow passband whose center is a frequency of f0−100 kHz and whose upper limit is a frequency less than of, while the BPF 922a has a relatively narrow passband whose center is a frequency of f0+100 kHz and whose lower limit is a frequency higher than f0.

Also, the smoothing processing units 923a and 924a make the output signals of the BPFs 921a and 922a absolute values, and then smooth them, respectively, so as to output the amplitude levels of the signals having passed through the BPFs 921a and 922a, respectively, in the IF signals as the undesired levels L2a and L3a. Then, the addition unit 925a adds up the output signals of the smoothing processing units 923a and 924a, to output the sum of the undesired levels L2a and L3a as an undesired level L4.

As mentioned above, the BPFs 921a and 922a both reject the desired signal and pass the adjacent undesired signals on the lower side and the upper side of the desired signal, respectively, and thus, the higher the amplitude level of the adjacent undesired signal is, the higher the undesired level L4 becomes. Also, the higher the amplitude level of the adjacent undesired signal on the lower side of the desired signal is, the higher the undesired level L2a becomes, while the higher the amplitude level of the adjacent undesired signal on the upper side of the desired signal is, the higher the undesired level L3a becomes. Moreover, as mentioned above, in an embodiment of the present invention, since the amplitude level of the IF signal is controlled so as to become the substantially predetermined level, the proportion of the adjacent undesired signal included in the received signal can be determined by the undesired level L4, and the proportions of the adjacent undesired signals on the lower side and the upper side of the desired signal included in the received signal can be determined by the undesired levels L2a and L3a, respectively.

As such, the proportion of the adjacent undesired signal included in the received signal can be determined by the undesired levels L1 and L4 outputted from the undesired level detection units 91 and 92a, respectively. If the adjacent undesired signal is sufficiently great with respect to the desired signal, the proportion can be quantitatively determined by the undesired level L1, however, if the adjacent undesired signal is small with respect to the desired signal, the undesired level L1 becomes extremely low, and thus, it is preferable to make a determination by the undesired level L4. Moreover, since the proportions of the adjacent undesired signals on the lower side and the upper side of the desired signal included in the received signals, respectively, can be determined by the undesired levels L2a and L3a outputted from the undesired level detection unit 92a, if the adjacent undesired signal is small with respect to the desired signal, it is preferable to make a determination by the undesired level L2a or L3a.

Operation of Determination Unit

The determination unit 93 determines whether or not a state is an undesired state (interference state), where an adjacent undesired signal is present, according to the frequency difference Df and the undesired level L4, selects any one of the undesired levels L1, L2a, and L3a, to be outputted as the undesired level determination value UD.

Figure 3:
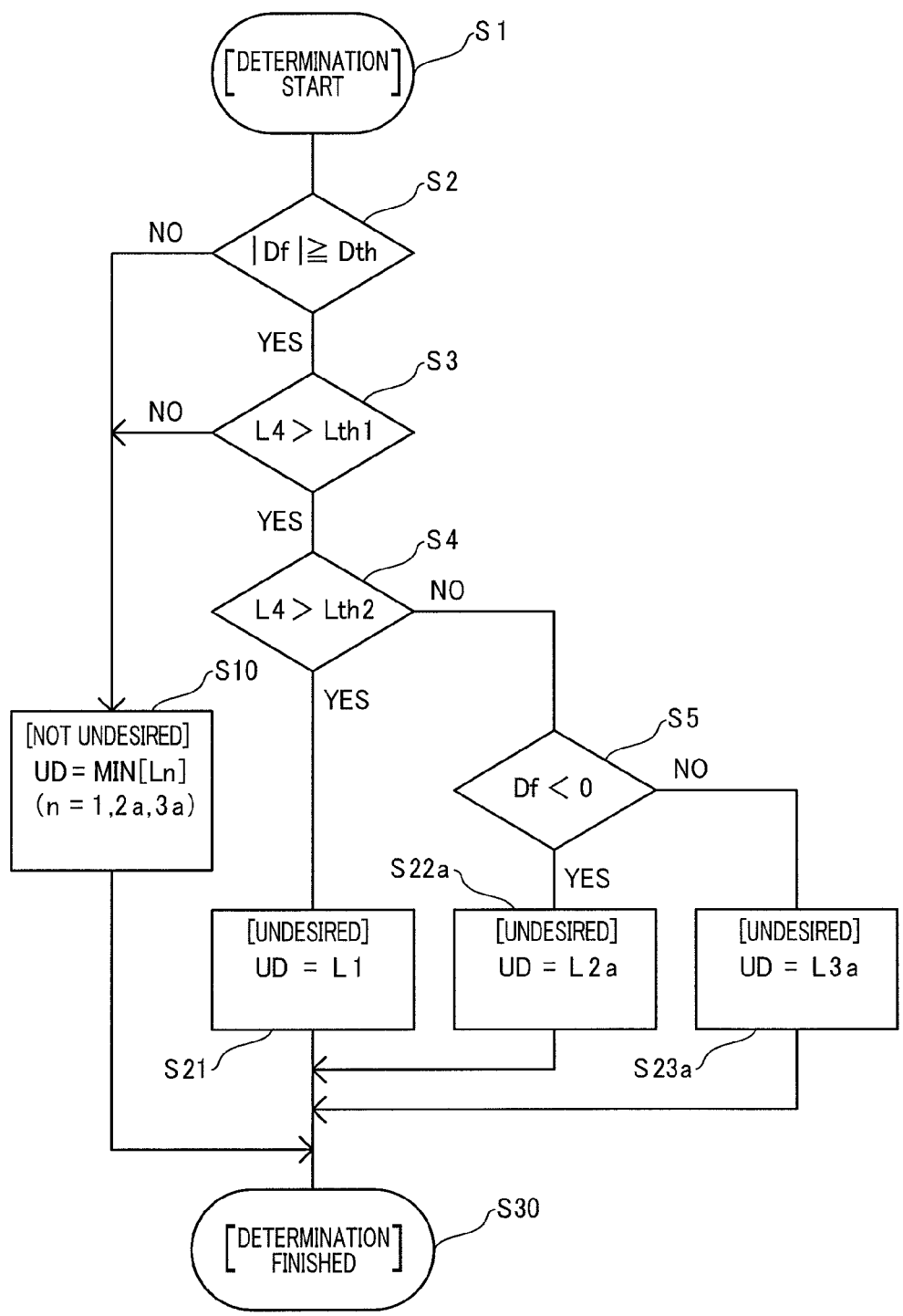
FIG. 3 is a flowchart illustrating an operation of a determination unit according to a first embodiment of the present invention.

An operation of the determination unit 93 according to an embodiment of the present invention will hereinafter be described referring to FIG. 3.

When determination processing is started (S1), the determination unit 93 first determines whether or not an absolute value of the frequency difference Df is equal to or greater than a predetermined reference value Dth (S2).

If it is determined at S2 that the absolute value of the frequency difference Df is lower than the reference value Dth (S2: NO), the frequency of the received signal is substantially equal to the frequency of the desired signal, and thus, it is determined that the state is not an undesired state, and the minimum level in the undesired levels L1, L2a and L3a is selected to be outputted as the undesired level determination value UD (S10), and the determination processing is finished (S30). The state which is not the undesired state includes not only a state where no adjacent undesired signal is present but also a state where the adjacent undesired signal is sufficiently small with respect to the desired signal.

On the other hand, if it is determined at S2 that the absolute value of the frequency difference Df is equal to or greater than the reference value Dth (S2: YES), then, it is determined whether or not the undesired level L4 is higher than a (first) reference level Lth1 (S3).

If it is determined at S3 that undesired level L4 is equal to or smaller than the reference level Lth1 (S3: NO), the adjacent undesired signal is sufficiently small with respect to the desired signal, and thus, it is determined that the state is not an undesired state, and the minimum level is selected from the undesired levels L1, L2a, and L3a, to be outputted as the undesired level determination value UD (S10) and the determination processing is finished (S30).

On the other hand, if it is determined at S3 that the undesired level L4 is higher than the reference level Lth1 (S3: YES), it is determined that the state is an undesired state, and then, it is determined whether or not the undesired level L4 is higher than a (second) reference level Lth2 (S4). In an embodiment of the present invention, the reference level Lth2 is higher than the reference level Lth1 and is such a level as to be a reference by which to determine whether or not the adjacent undesired signal is sufficiently great with respect to the desired signal to such a degree that the proportion of the adjacent undesired signal included in the received signal can be quantitatively determined by the undesired level L1. As an example, the reference level Lth2 is set to a level of the undesired level L4 when a DU ratio (Desired signal to Undesired signal ratio) indicating a ratio between the amplitude level of the desired signal and the amplitude level of the adjacent undesired signal is 1 (0 dB).

If it is determined at S4 that the undesired level L4 is higher than the reference level Lth2 (S4: YES), the adjacent undesired signal is sufficiently great with respect to the desired signal, and thus, the undesired level L1 is selected to be outputted as the undesired level determination value UD (S21), and the determination processing is finished (S30).

On the other hand, if it is determined at S4 that the undesired level L4 is equal to or smaller than the reference level Lth2 (S4: NO), then, it is determined whether the frequency difference Df is positive or negative (S5). Since it has been determined at S2 that the absolute value of the frequency difference Df is equal to or greater than the reference value Dth (S2: YES), the frequency difference Df does not become 0 at S5.

At S5, if it is determined that the frequency difference Df (=fr−fd=fi−f0) is negative (S5: YES), since the frequency of the received signal is lower than the frequency of the desired signal due to the adjacent undesired signal on the lower side of the desired signal, the undesired level L2a is selected to be outputted as the undesired level determination value UD (S22a), and the determination processing is finished (S30).

On the other hand, if it is determined that the frequency difference Df is positive (S5: NO), the frequency of the received signal is higher than the frequency of the desired signal due to the adjacent undesired signal on the upper side of the desired signal, and thus, the undesired level L3a is selected to be outputted as the undesired level determination value UD (S23a), and the determination processing is finished (S30).

As mentioned above, the determination unit 93 first determines whether or not the state is an undesired state on the basis of the absolute value of the frequency difference Df and the undesired level L4 (S2 and S3), and if it determines that the state is not an undesired state, it outputs the undesired level determination value UD of a small value (S10). If the determination unit 93 determines that the state is an undesired state, it selects the undesired level L1, L2a or L3a on the basis of the undesired level L4 and the positive/negative of the frequency difference Df, to output the undesired level determination value UD, by which the proportion of the adjacent undesired signal included in the received signal can quantitatively be determined (S21, S22a, and S23a).

SECOND EMBODIMENT

Configuration of Adjacent Interference Detection Unit

A configuration and an operation of the entire receiving apparatus according to an embodiment of the present invention is the same as a configuration and an operation of the entire receiving apparatus according to a first embodiment of the present invention.

A configuration of an adjacent interference detection unit according to a second embodiment of the present invention will hereinafter be described referring to FIG. 4.

Figure 4:
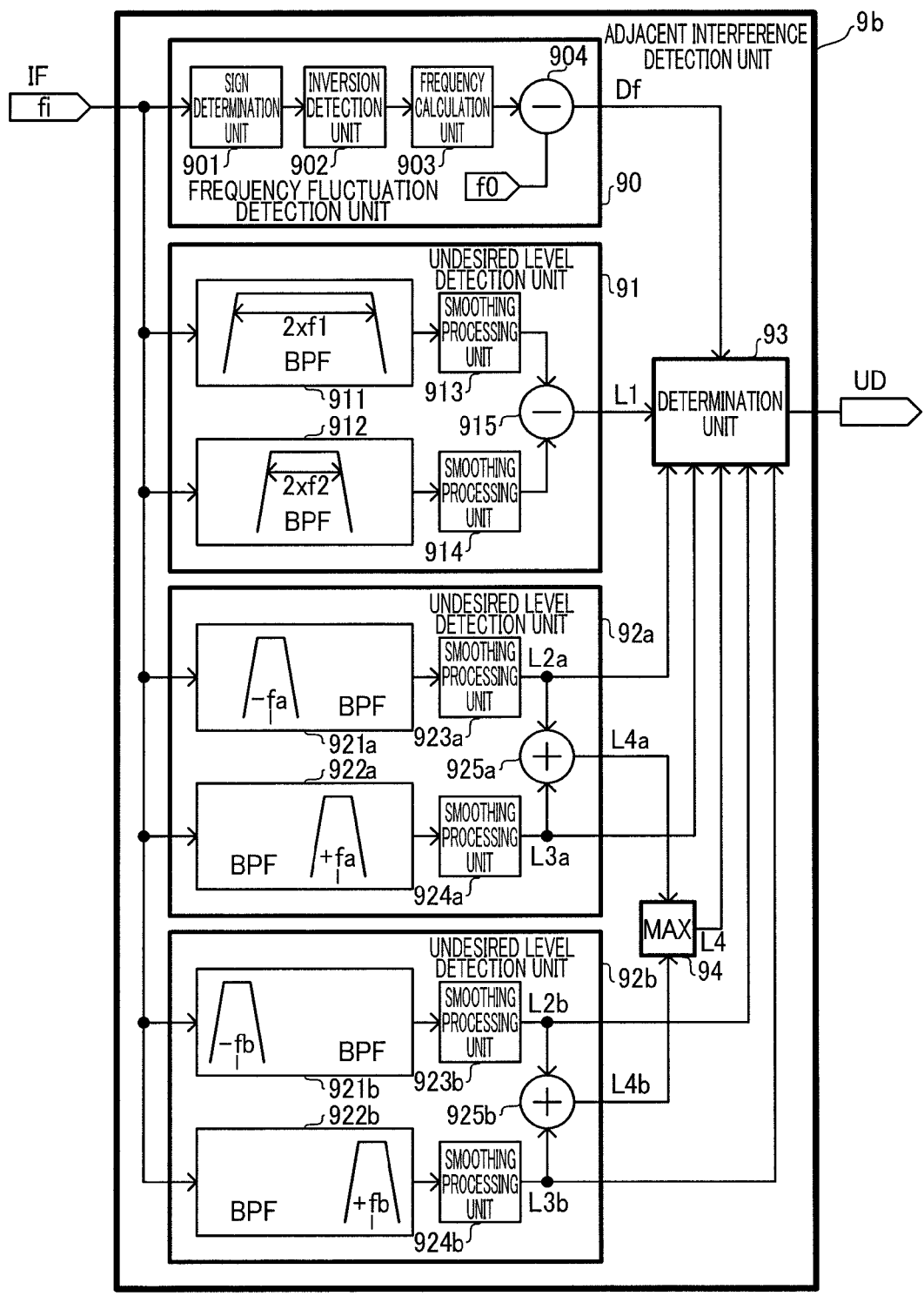
FIG. 4 is a block diagram illustrating a configuration of an adjacent interference detection unit according to a second embodiment of the present invention.

An adjacent interference detection unit 9b shown in FIG. 4 includes the frequency fluctuation detection unit 90, the undesired level detection units 91, 92a, 92b, a maximum value selection unit 94, and the determination unit 93, and the IF signal outputted from the AD conversion unit 3 is inputted in parallel to the frequency fluctuation detection unit 90 and the undesired level detection units 91, 92a, 92b.

The frequency fluctuation detection unit 90 according to an embodiment of the present invention has the same configuration as that of the frequency fluctuation detection unit 90 according to a first embodiment of the present invention, and the frequency difference Df outputted from the subtraction unit 904 is inputted to the determination unit 93. The (first) undesired level detection unit 91 according to an embodiment of the present invention has the same configuration as that of the undesired level detection unit 91 according to a first embodiment of the present invention, and the (first) undesired level L1 outputted from the subtraction unit 915 is inputted to the determination unit 93.

The two (second) undesired level detection units 92a and 92b according to an embodiment of the present invention both have the same configuration as that of the undesired level detection unit 92a according to an first embodiment of the present invention, and the (second) undesired levels L2a and L2b outputted from the smoothing processing units 923a and 923b, respectively, and the (third) undesired levels L3a and L3b outputted from the smoothing processing units 924a and 924b, respectively, are all inputted to the determination unit 93. The undesired levels L4a and L4b outputted from the addition units 925a and 925b, respectively, are both inputted to the maximum value selection unit 94. As will be described later, the undesired level detection units 92a and 92b have predetermined frequencies different from each other, which determine the center frequencies of the passbands of the BPFs included therein, respectively.

The (fourth) undesired level L4 outputted from the maximum value selection unit 94 is inputted to the determination unit 93, and the undesired level determination value UD outputted from the determination unit 93 is outputted from the adjacent interference detection unit 9b.

As is obvious from the above, in the adjacent interference detection unit 9a according to a first embodiment of the present invention, the undesired level L4 is inputted from the undesired level detection unit 92a to the determination unit 93, while in the adjacent interference detection unit 9b according to an embodiment of the present invention, the undesired levels L4a and L4b are inputted from the undesired level detection units 92a and 92b to the maximum value selection unit 94, respectively, and the undesired level L4 is inputted from the maximum value selection unit 94 to the determination unit 93.

Operation of Adjacent Interference Detection Unit

Subsequently, an operation of the adjacent interference detection unit 9b according to an embodiment of the present invention will be described.

The frequency fluctuation detection unit 90 outputs the frequency difference Df between the received signal and the desired signal, as in the case of the frequency fluctuation detection unit 90 according to a first embodiment of the present invention. The undesired level detection unit 91 outputs as the undesired level L1 the difference in amplitude level between the signals having passed through the BPFs 911 and 912, respectively, in the IF signals, as in the case of the undesired level detection unit 91 according to a first embodiment of the present invention.

The undesired level detection unit 92a outputs as the undesired levels L2a and L3a the amplitude levels of the signals having passed through the BPFs 921a and 922a, respectively, in the IF signals, as in the case of the undesired level detection unit 92a according to a first embodiment of the present invention. Also, the undesired level detection unit 92a outputs the sum of the undesired levels L2a and L3a as the undesired level L4a.

The BPFs 921b and 922b of the undesired level detection unit 92b have the passbands with the frequency (f0−fb) and the frequency (f0+fb) as the centers, which are lower and higher than the frequency f0 only by a predetermined frequency fb, respectively. Therefore, the BPF 921b passes the frequency component in the vicinity of the f0−fb included in the IF signal, while the BPF 922b passes the frequency component in the vicinity of f0+fb included in the IF signal.

In an embodiment of the present invention, it is assumed that the frequencies fa and fb are in a relationship of fa<fb, the BPFs 921b and 922b both have the passbands which reject the adjacent undesired signal (hereinafter referred to as a first adjacent undesired signal) to be passed by the BPFs 921a and 922b and which pass the adjacent undesired signals (hereinafter referred to as second adjacent undesired signals) on the further lower side and upper side of the first adjacent undesired signal, respectively. As an example, the frequency fb is set at 200 kHz, the BPF 921b has a relatively narrow passband whose center is a frequency of f0−200 kHz and whose upper limit is a frequency less than f0−100 kHz, while the BPF 922b has a relatively narrow passband whose center is a frequency of f0+200 kHz and whose upper limit is a frequency higher than f0+100 kHz.

Also, the smoothing processing units 923b and 924b make the output signals of the BPFs 921b and 922b absolute values, and then smooth them, respectively, so as to output the amplitude levels of the signals having passed through the BPFs 921b and 922b, respectively, in the IF signals as the undesired levels L2b and L3b. Then, the addition unit 925b adds up the output signals of the smoothing processing units 923b and 924b, to output the sum of the undesired levels L2b and L3b as an undesired level L4b.

As mentioned above, the BPFs 921b and 922b both reject the first adjacent undesired signals and pass the second adjacent undesired signals on the further lower side and upper side of the first adjacent undesired signal, respectively, and thus, the higher the amplitude level of the second adjacent undesired signal is, the higher the undesired level L4b becomes. Also, the higher the amplitude level of the second adjacent undesired signal on the further lower side of the first adjacent undesired signal is, the higher the undesired level L2b becomes, while the higher the amplitude level of the second adjacent undesired signal on the further upper side of the first adjacent undesired signal is, the higher the undesired level L3b becomes. Moreover, as mentioned above, in an embodiment of the present invention, since the amplitude level of the IF signal is controlled so as to become the substantially predetermined level, the proportion of the second adjacent undesired signal included in the received signal can be determined by the undesired level L4b, and the proportions of the second adjacent undesired signals on the further lower side and upper side of the first adjacent undesired signal included in the received signal can be determined by the undesired levels L2b and L3b, respectively.

The maximum value selection unit 94 selects the maximum level in the undesired levels L4*a* and L4*b*, to be outputted as the undesired level L4.

Operation of Determination Unit

The determination unit 93 determines whether or not a state is an undesired state, where an adjacent undesired signal is present, according to the frequency difference Df and the undesired level L4, selects any one of the undesired levels L1, L2*a*, L2*b*, L3*a*, and L3*b*, to be outputted as the undesired level determination value UD. As mentioned above, in the determination unit 93 in a first embodiment of the present invention, the undesired level L4 outputted from the undesired level detection unit 92*a* is used, while in the determination unit 93 in an embodiment of the present invention, the undesired level L4 is used, which is the maximum level in the undesired levels L4*a* and L4*b* outputted from the undesired level detection units 92*a* and 92*b*, respectively. Also, when the adjacent interference detection unit includes three or more second undesired level detection units, as well, the maximum level in the sums of the second and the third undesired levels outputted from the three or more second undesired level detection units, respectively, is used as the fourth undesired level.

Figure 5:
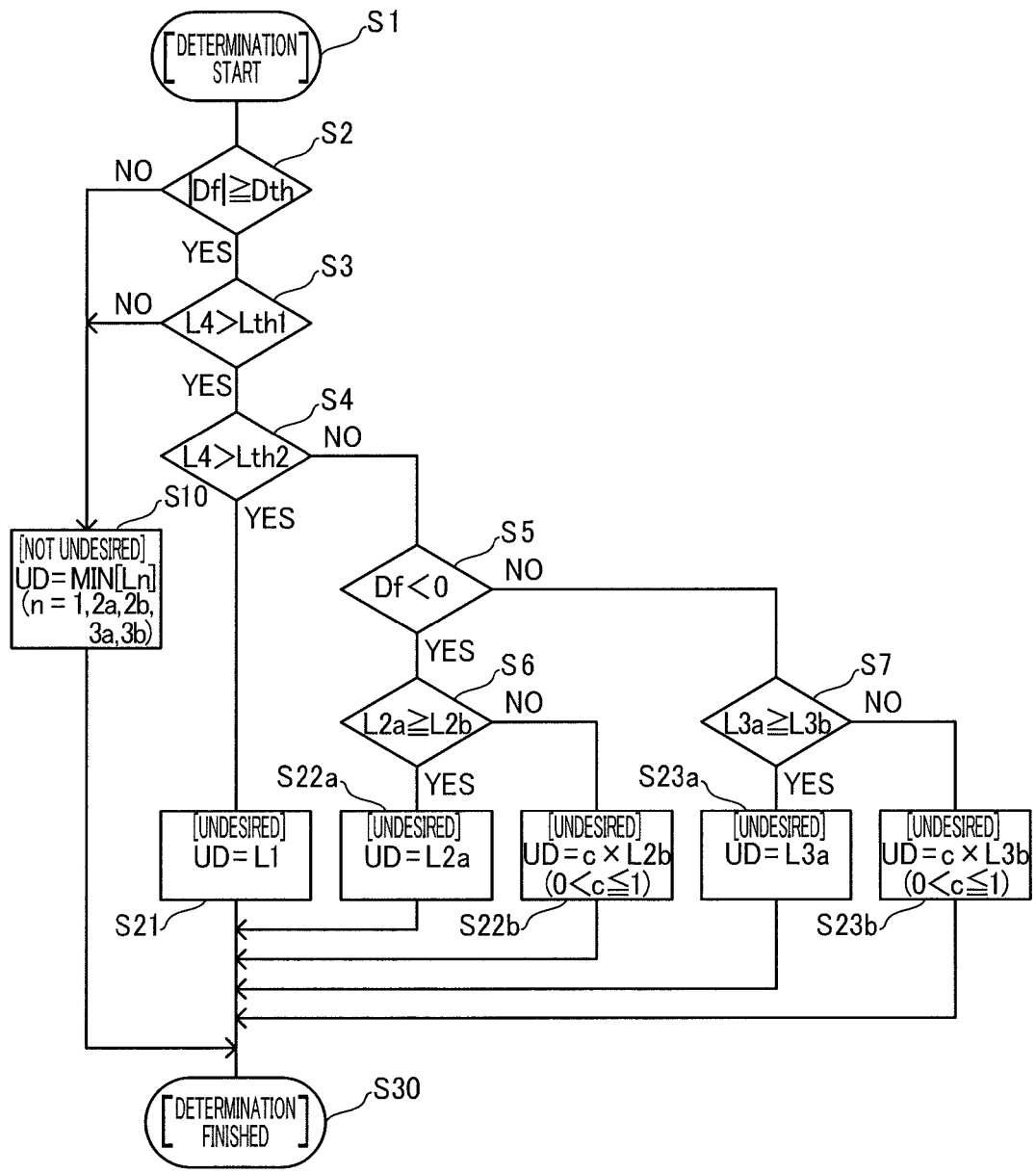
FIG. 5 is a flowchart illustrating an operation of a determination unit according to a second embodiment of the present invention.

An operation of the determination unit 93 according to an embodiment of the present invention will hereinafter be described referring to FIG. 5.

When the determination processing is started (S1), the determination unit 93 first determines whether or not a state is an undesired state (S2 and S3) as in the case of the determination unit 93 in a first embodiment of the present invention.

If it is determined at S2 that the absolute value of the frequency difference Df is lower than the reference value Dth (S2: NO), or if it is determined at S3 that the undesired level L4 is equal to or smaller than the reference level Lth1 (S3: NO), it is determined that the state is not an undesired state, and the minimum level in the undesired levels L1, L2*a*, L2*b*, L3*a*, and L3*b* is selected to be outputted as the undesired level determination value UD (S10), and the determination processing is finished (S30).

On the other hand, if it is determined at S2 that the absolute value of the frequency difference Df is equal to or greater than the reference value Dth and it is determined at S3 that the undesired level L4 is higher than the reference level Lth1 (S2: YES and S3: YES), it is determined that the state is an undesired state, and then, it is determined whether or not the undesired level L4 is higher than the reference level Lth2 (S4).

If it is determined at S4 that the undesired level L4 is higher than the reference level Lth2 (S4: YES), the adjacent undesired signal is sufficiently great with respect to the desired signal, and thus, the undesired level L1 is selected to be outputted as the undesired level determination value UD (S21), and the determination processing is finished (S30).

On the other hand, if it is determined at S4 that the undesired level L4 is equal to or smaller than the reference level Lth2 (S4: NO), then, it is determined whether the frequency difference Df is positive or negative (S5).

If it is determined at S5 that the frequency difference Df is negative (S5: YES), the frequency of the received signal is lower than the frequency of the desired signal due to the adjacent undesired signal on the lower side of the desired signal, and thus, then, it is determined which is greater or smaller between the undesired levels L2*a* and L2*b* (S6).

If it is determined at S6 that the undesired level L2*a* is equal to or greater than the undesired level L2*b* (S6: YES), the amplitude level of the first adjacent undesired signal is equal to or greater than the amplitude level of the second adjacent undesired signal, and thus, the undesired level L2*a* is selected, to be outputted as the undesired level determination value UD (S22*a*), and the determination processing is finished (S30).

On the other hand, if it is determined at S6 that the undesired level L2*a* is lower than the undesired level L2*b* (S6: NO), the amplitude level of the first adjacent undesired signal is lower than the amplitude level of the second adjacent undesired signal, and thus, the undesired level L2*b* is selected and multiplied by a coefficient c, which will be described later, to be outputted as the undesired level determination value UD (S22*b*), and the determination processing is finished (S30).

If it is determined at S5 that the frequency difference Df is positive (S5: NO), the frequency of the received signal is higher than the frequency of the desired signal due to the adjacent undesired signal on the upper side of the desired signal, and thus, then, it is determined which is greater or smaller between the undesired levels L3*a* and L3*b* (S7).

If it is determined at S7 that the undesired level L3*a* is equal to or greater than the undesired level L3*b* (S7: YES), the amplitude level of the first adjacent undesired signal is equal to or greater than the amplitude level of the second adjacent undesired signal, and thus, the undesired level L3*a* is selected to be outputted as the undesired level determination value UD (S23*a*), and the determination processing is finished (S30).

On the other hand, if it is determined at S7 that the undesired level L3*a* is lower than the undesired level L3*b* (S7: NO), the amplitude level of the first adjacent undesired signal is lower than the amplitude level of the second adjacent undesired signal, and thus, the undesired level L3*b* is selected and multiplied by the coefficient c, to be outputted as the undesired level determination value UD (S23*b*), and the determination processing is finished (S30).

As mentioned above, as in the case of a first embodiment of the present invention, the determination unit 93 first determines whether or not the state is an undesired state (S2 and S3), and if it is determined that the state is not an undesired state, it outputs a small value of the undesired level determination value UD (S10). If the determination unit 93 determines that the state is an undesired state, it selects the maximum level in the undesired levels L1, L2*a*, and L2*b* or the maximum level in the undesired levels L3*a* and L3*b* on the basis of the undesired level L4 and the positive/negative of the frequency difference Df, to output the undesired level determination value UD by which the proportion of the adjacent undesired signal included in the received signal can quantitatively be determined (S21, S22*a*, S22*b*, S23*a*, and S23*b*).

In an embodiment of the present invention, when the undesired level L2*b* or L3*b* is selected, the determination unit 93 multiplies the level by the coefficient c, which is greater than 0 and equal to or smaller than 1, to be outputted. The second adjacent undesired signal has a smaller influence on the desired signal than that in the case of the first adjacent undesired signal, and thus, the value obtained by multiplying the undesired level L2*b* or L3*b* by the coefficient c is set as the undesired level determination value UD, so that the influence of the adjacent undesired signal on the desired signal can be reflected in the undesired level determination value UD. Also, when the adjacent interference detection unit includes three or more second undesired level detection units, as well, coefficients are set according to predetermined frequencies by which to determine the center frequencies of the passbands of the BPFs included in the three or more second undesired level detection units, respectively. As an example, the coefficients can be set at 1, 0.5, and 0.25 for the three second undesired level detection units with the predetermined frequencies of 100 kHz, 200 kHz, and 300 kHz, respectively.

As mentioned above, in the adjacent interference detection unit 9a, if the absolute value of the frequency difference Df is equal to or greater than the reference value Dth, it is determined whether or not the state is an undesired state according to the undesired level L4, as well as the undesired level L1, L2a or L3a is selected according to at least one of the frequency difference Df and the undesired level L4, to be outputted as the undesired level determination value UD, so that a large-time-constant smoothing processing unit is not required, and there can be reduced time required for determining presence or absence of the adjacent undesired signal.

In the determination unit 93 of the adjacent interference detection unit 9a, if the absolute value of the frequency difference Df is equal to or greater than the reference value Dth and if the undesired level L4 is higher than the reference level Lth1, it is determined that the state is an undesired state, as well as if the undesired level L4 is higher than the reference level Lth2, the undesired level L1 is selected, and if the undesired level L4 is equal to or smaller than the reference level Lth2 and if the frequency difference Df is negative, the undesired level L2a is selected, and if the undesired level L4 is equal to or smaller than the reference level Lth2 and if the frequency difference Df is positive, the undesired level L3a is selected, so that the undesired level determination value UD can be outputted by which the proportion of the adjacent undesired signal included in the received signal can quantitatively be determined.

In the adjacent interference detection unit 9b, the maximum level in the sums of the second and third undesired levels outputted from the plurality of second undesired level detection units, respectively, is set at the fourth undesired level, and the first undesired level, the maximum level in the second undesired levels, or the maximum level in the third undesired levels is selected to be outputted as the undesired level determination value UD, and thus, there can be improved in accuracy with which to determine the proportion of the adjacent undesired signal included in the received signal.

In the determination unit 93 of the adjacent interference detection unit 9b, when the maximum level in the second or third undesired levels is selected, the selected level is multiplied by a coefficient set according to a predetermined frequency by which to determine the center frequency of a passband of a BPF included in the plurality of the second undesired level detection units, to be outputted, so that the influence of the adjacent undesired signal on the desired signal can be reflected in the undesired level determination value UD.

In the determination unit 93, if the absolute value of the frequency difference Df is lower than the reference value Dth, or if the undesired level L4 is equal to or smaller than the reference level Lth1, it is determined that the state is not an undesired state, and the minimum level in the first to third undesired levels selected to be outputted, so that a small value of the undesired level determination value UD can be outputted, which indicates that the state is not an undesired state.

In an embodiment described above, the receiving apparatus is configured as a super-heterodyne receiving apparatus that performs frequency conversion from the RF band to the IF band in the receiving unit 2, but this is not limitative. The receiving apparatus may be configured as a direct-conversion receiving apparatus that does not requires an IF filter, so that a circuit scale can be reduced. The frequency fd of the desired signal in the RF band is changed according to a broadcasting station to be received or the like, however, the frequency f0 of the desired signal in the IF band is a predetermined value for each receiving apparatus, and thus, in an embodiment as described above, the apparatus is configured as the super-heterodyne receiving apparatus, so that it is not required to change a passband of each of BPFs in the undesired level detection units 91, 92a, and 92b according to the frequency fd.

In the receiving apparatus according to an embodiment described above, as illustrated in FIG. 2, the IF signal, which is a digital signal, is inputted to the IF amplification unit 4 and the adjacent interference detection unit 9, and the subsequent processing is performed by digital signal processing, but this is not limitative. The receiving apparatus may be an apparatus in which an output signal of the receiving unit 2 is directly inputted to the IF amplification unit 4 and the adjacent interference detection unit 9 and the subsequent processing is performed by analog signal processing.

In an embodiment described above, as shown in FIG. 2, the receiving apparatus controls the IF amplification unit 4 and the audio processing unit 6 according to the undesired level determination value UD outputted from the adjacent interference detection unit 9, but this is not limitative. The receiving apparatus may include a detection unit for detecting other reception statuses such as electric field intensity of a received signal and presence or absence of a multipass undesired signal.

In an embodiment described above, the adjacent interference detection unit selects any one of the undesired levels outputted from the undesired level detection units, to be outputted as the undesired level determination value UD, but this is not limitative. For example, the adjacent interference detection unit may further calculate the above-mentioned DU ratio from the undesired level determination value UD, to be outputted. The higher the amplitude level of the adjacent undesired signal becomes, the smaller undesired level determination value UD becomes, however, to the contrary, the greater the DU ratio becomes.

In an embodiment described above, if it is determined that a state is not an undesired state, the adjacent interference detection unit selects the minimum level in the undesired levels outputted from the undesired level detection units, respectively, to be outputted as the undesired level determination value UD, but this is not limitative. The adjacent interference detection unit may output the undesired level determination value UD of a small value such as 0, for example, so as to indicate that the state is not an undesired state.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. A receiving apparatus comprising:
    a frequency fluctuation detection unit configured to detect a frequency difference between a frequency of a received signal and a frequency of a desired signal to be received;
    a first undesired level detection unit including first and second band-pass filters having passbands whose band widths are different from each other and whose centers are the frequency of the desired signal, the first undesired level detection unit configured to output as a first undesired level a difference in amplitude level between the signals having passed through the first and second band-pass filters in the received signals;
    one or a plurality of second undesired level detection units including third and fourth band-pass filters having passbands whose centers are the frequencies lower and higher by a predetermined frequency than the frequency of the desired signal, respectively, the one or the plurality of second undesired level detection units configured to output amplitude levels of signals having passed through the third and fourth band-pass filters in the received signals as second and third undesired levels, respectively, and output a sum of the second and third undesired levels as a fourth undesired level; and a determination unit configured to determine whether or not a state is an undesired state where an adjacent undesired signal is present according to the fourth undesired level if an absolute value of the frequency difference is equal to or greater than a predetermined reference value, the determination unit further configured to select any one of the first to third undesired levels to be outputted according to at least one of the frequency difference and the fourth undesired level if determining that the state is the undesired state.

2. A receiving apparatus according to claim 1, wherein the determination unit determines that a state is the undesired state if the absolute value of the frequency difference is equal to or greater than the reference value and if the fourth undesired level is higher than a first reference level, as well as outputs the first undesired level if the fourth undesired level is higher than a second reference level that is higher than the first reference level;

outputs the second undesired level if the fourth undesired level is equal to or smaller than the second reference level and if the frequency of the received signal is lower than the frequency of the desired signal; and outputs the third undesired level if the fourth undesired level is equal to or smaller than the second reference level and if the frequency of the received signal is higher than the frequency of the desired signal.

3. The receiving apparatus according to claim 2, wherein if the absolute value of the frequency difference is lower than the reference value or the fourth undesired level is equal to or lower than the first reference level, the determination unit determines that a state is not the undesired state and select the minimum level in the first to third undesired levels, to be outputted.

4. The receiving apparatus according to claim 1, further comprising the plurality of second undesired level detection units, wherein the predetermined frequency varies with the plurality of second undesired level detection units, wherein the fourth undesired level is the maximum level in the sums of the second and third undesired levels outputted from the plurality of second undesired level detection units, respectively, wherein the determination unit determines that a state is the undesired state, if the absolute value of the frequency difference is equal to or greater than the reference value and if the fourth undesired level is higher than a first reference level, as well as outputs the first undesired level if the fourth undesired level is higher than a second reference level that is higher than the first reference level;

outputs the maximum level in the second undesired levels outputted from the plurality of second undesired level detection units, respectively, if the fourth undesired level is equal to or lower than the second reference level and if the frequency of the received signal is lower than the frequency of the desired signal; and outputs the maximum level in the third undesired levels outputted from the plurality of second undesired level detection units, respectively, if the fourth undesired level is equal to or lower than the second reference level and if the frequency of the received signal is higher than the frequency of the desired signal.

5. The receiving apparatus according to claim 4, wherein if the determination unit outputs the maximum level in the second or third undesired levels outputted from the plurality of second undesired level detection units, respectively, the determination unit multiplies the maximum level by a coefficient corresponding to the predetermined frequency of the second undesired level detection unit outputting the second or third undesired level that is the maximum level, and outputs the maximum level multiplied by the coefficient.

6. The receiving apparatus according to claim 5, wherein if the absolute value of the frequency difference is lower than the reference value or the fourth undesired level is equal to or lower than the first reference level, the determination unit determines that a state is not the undesired state and select the minimum level in the first to third undesired levels, to be outputted.

7. The receiving apparatus according to claim 4, wherein if the absolute value of the frequency difference is lower than the reference value or the fourth undesired level is equal to or lower than the first reference level, the determination unit determines that a state is not the undesired state and select the minimum level in the first to third undesired levels, to be outputted.

* * * * *